United States Patent
Volpert (10) Patent No.: US 9,367,062 B2
(45) Date of Patent: Jun. 14, 2016

(54) SYSTEM AND METHOD FOR OPERATIONAL DATA RETRIEVAL FROM A POWER TOOL

(71) Applicants: Robert Bosch Tool Corporation, Broadview, IL (US); Robert Bosch GmbH, Stuttgart (DE)

(72) Inventor: Dieter Volpert, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 14/142,203

(22) Filed: Dec. 27, 2013

(65) Prior Publication Data

US 2014/0184397 A1 Jul. 3, 2014

Related U.S. Application Data (60) Provisional application No. 61/747,731, filed on Dec. 31, 2012.

(51) Int. Cl.
*G08B 1/08* (2006.01)
*G08B 13/14* (2006.01)
(Continued)

(52) U.S. Cl.
CPC .. *G05B 19/05* (2013.01); *B25F 5/00* (2013.01)

(58) Field of Classification Search
CPC ...... H04B 3/56; H04B 3/54; G06K 19/07749; E05B 73/0017; G08C 19/12; A61B 17/3211; A61B 18/1402; B27G 19/02; B21D 45/00; B26D 1/24
USPC ........ 340/538.15, 572.8, 572.9, 13.24, 12.37; 606/167, 45; 83/58, 131, 441
See application file for complete search history.

(56) References Cited

U.S. PATENT DOCUMENTS 6,845,279 B1 * 1/2005 Gilmore ............... G05B 19/406
340/426.1
7,510,110 B2 3/2009 Pietrzyk et al.
(Continued)

FOREIGN PATENT DOCUMENTS

EP 0974808 B1 9/2003
EP 1852760 A1 11/2007
(Continued)

OTHER PUBLICATIONS

International Search Report and Written Opinion corresponding to PCT Application No. PCT/US2013/078172, mailed Apr. 10, 2014 (11 pages).

*Primary Examiner* — George Bugg
*Assistant Examiner* — Munear Akki
(74) *Attorney, Agent, or Firm* — Maginot Moore & Beck LLP (57) ABSTRACT

A power tool data collection system includes a memory in a housing of a power tool that stores data corresponding to at least one operational parameter of the power tool, a wireless data transceiver communicatively connected to the memory, and a controller operatively connect to the memory. The wireless data transceiver transmits the data corresponding to the at least one operational parameter of the power tool to an external wireless transceiver in response to receiving a signal from the external wireless transceiver. The controller identifies the at least one operational parameter of the power tool during operation of the power tool and stores the data corresponding to the at least one operational parameter in the memory to enable the wireless data transceiver to transmit the data.

18 Claims, 3 Drawing Sheets

(51) Int. Cl.
*G08C 19/12* (2006.01)
*G08C 19/02* (2006.01)
*A61B 17/32* (2006.01)
*A61B 18/18* (2006.01)
*B26D 5/00* (2006.01)
*B26D 7/06* (2006.01)
*B27B 11/02* (2006.01)
*G05B 19/05* (2006.01)
*B25F 5/00* (2006.01)

(56) References Cited

U.S. PATENT DOCUMENTS

| | | | |
|---|---|---|---|
| 8,037,616 B2 | 10/2011 | Stockman | |
| 8,169,298 B2 | 5/2012 | Wiesner et al. | |
| 2005/0000998 A1* | 1/2005 | Grazioli | B25B 27/0085 227/2 |
| 2008/0252446 A1 | 10/2008 | Dammertz | |
| 2009/0027005 A1* | 1/2009 | Osswald | H02J 7/0042 320/112 |
| 2009/0091465 A1* | 4/2009 | Buckingham | A61B 5/11 340/683 |
| 2010/0140345 A1* | 6/2010 | Sakamoto | B25B 21/00 235/376 |
| 2010/0216415 A1* | 8/2010 | Arimura | G08C 17/02 455/90.1 |
| 2011/0056715 A1* | 3/2011 | Vanko | B25F 5/00 173/176 |
| 2011/0143661 A1 | 6/2011 | Hartwig et al. | |
| 2013/0109375 A1* | 5/2013 | Zeiler | H04W 12/12 455/426.1 |
| 2014/0011455 A1* | 1/2014 | Hsu | B60C 23/0447 455/41.3 |
| 2014/0025834 A1* | 1/2014 | Mergener | H04L 69/03 709/230 |
| 2014/0107853 A1* | 4/2014 | Ashinghurst | G05B 19/048 700/297 |
| 2014/0151079 A1* | 6/2014 | Furui | B25F 5/02 173/46 |

FOREIGN PATENT DOCUMENTS

| | | |
|---|---|---|
| EP | 2248632 A1 | 11/2010 |
| EP | 2272632 A1 | 1/2011 |
| WO | 2008125194 A2 | 10/2008 |
| WO | 2011076263 A1 | 6/2011 |

* cited by examiner

SYSTEM AND METHOD FOR OPERATIONAL DATA RETRIEVAL FROM A POWER TOOL

CLAIM OF PRIORITY

This application claims priority to U.S. Provisional Application No. 61/747,731, which is entitled "System And Method For Operational Data Retrieval From A Power Tool," and was filed on Dec. 31, 2012.

TECHNICAL FIELD

This disclosure relates generally to power tools and, more particularly, to systems and methods for retrieving and displaying diagnostic and operational data for power tools and measuring devices.

BACKGROUND

Power tools are commonly used in many industries including, but not limited to, construction and manufacturing, as well as by individuals engaged in hobby and home improvement projects. As used herein, the term "power tool" includes a wide range of devices including, but not limited to, saws, drills, routers, nail drivers, grinders, sanders, measuring tools that include at least one electronic component. Many power tools include a moving part that is driven by, for example, an electric motor, hydraulic or pneumatic actuator, or a combustion engine. Measuring tools include, but are not limited to, calipers, level sensors, range finders, temperature sensors, humidity sensors, and the like. Handheld power tools are designed with a size and weight that enables a human operator to hold the power tool with one or two hands during operation. Many handheld power tools are referred to as "cordless" or "wireless" handheld power tools that receive electrical power from a battery that is connected to the power tool instead of requiring an electrical cord that runs to an electrical outlet.

Modern power tools often include digital control devices that control the operation of one or more components in the power tool during operation. Examples of digital control devices include, but are not limited to, microcontrollers, microprocessors, and application specific integrated circuits (ASICs). In some power tool embodiments, the digital control device in a power tool receives data from one or more sensors in the power tool to control operation of the power tool. For example, a digital controller receives temperature data from a temperature sensor that monitors the operating temperature of an electric motor in a saw. If the temperature of the motor exceeds a predetermined maximum temperature level, then the controller deactivates the motor to prevent damage due to overheating.

As described above, power tools that include digital controllers often collect data about the operational state of the power tool. Operators use information about the internal operational state of the power tool to use the power tools more efficiently, and maintenance personnel use the data to diagnose problems with the power tools or to perform preventative maintenance before problems arise. In existing power tools, however, the operators and maintenance personnel do not have access to the operational state data that are collected in the power tool. In some larger power tools additional hardware such as LCD displays or other output devices could be incorporated to display the operational state data of the power tool to an operator. Complex output devices, however, increase the weight and complexity of the power tool and can fail in harsh working environments. Additionally, handheld power tools that are designed to be small and light-weight are unable to accommodate large LCD displays or other large output devices without unacceptable increases to the size or weight of the power tool. Thus, improvements to power tools that enable operators and maintenance personnel to view the internal operating state data for a wide variety of power tools would be beneficial.

SUMMARY

In one embodiment, a system for retrieval of operational parameters from a power tool has been developed. The system includes a housing of a power tool, a memory within the housing, the memory being configured to store data corresponding to at least one operational parameter of the power tool, a wireless data transceiver affixed to the housing of the power tool and communicatively connected to the memory, the wireless data transceiver being configured to transmit the data corresponding to the at least one operational parameter of the power tool to an external wireless transceiver in response to receiving a signal from the external wireless transceiver, and a controller within the housing of the power tool. The controller is operatively connected to the memory and is configured to identify the at least one operational parameter of the power tool during operation of the power tool, and store the data corresponding to the at least one operational parameter in the memory to enable the wireless data transceiver to transmit the data.

In another embodiment, a method for retrieval of operational parameters from a power tool has been developed. The method includes identifying with a controller in a housing of the power tool at least one operational parameter of the power tool during operation of the power tool, storing with the controller data corresponding to the at least one operational parameter in a memory in the power tool, and transmitting with a wireless transceiver in the power tool the data corresponding to the at least one operational parameter in the memory to an external wireless transceiver in response to receiving a signal from the external wireless transceiver.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "mobile electronic device" refers to any electronic device that is configured to send data to a power tool and receive data from the power tool using a wireless data connection. Examples of mobile electronic devices include, but are not limited to, smartphones, tablets, notebook computers, thin client systems, thick client systems, gaming consoles, and the like. Another example of a mobile electronic device is a wearable computing device, such as a computing device that is integrated with a pair of glasses or other articles of clothing. The wearable computing device includes one or more sensors that read and optionally write data to tags and other suitable data storage devices including electrically erasable programmable read-only memory (EEPROM) devices through the a near-field communication (NFC) interface. Still another example of a mobile electronic device is an in-vehicle computing system that displays information retrieved from tags. In some configurations, the in-vehicle computing system includes one or more tag sensors in the vehicle to read and optionally write data to tags, while other configurations include a display, such as a dashboard display, to enable a user to view tag data retrieved using another mobile electronic device such as a smartphone. The mobile electronic devices use a combination of hardware and software to receive messages, display information about the internal state of the power tool, and to optionally send control signals to the power tool.

Power tools include a wide range of embodiments including stationary and bench-top power tools that remain in a substantially fixed location during use, as well as handheld power tools. As used herein, the terms "handheld power tool" or "handheld housing" of a power tool refer to a power tool that an operator holds in one or two hands during normal operation. The handheld housing of the power tool includes grips and handles that provide locations for the operator to hold and operate the power tool. A handheld power tool has a size and weight than enable the operator to lift, move, and orient the power tool as needed during use. Examples of handheld power tools include, but are not limited to, handheld drills, saws (such as miter saws, bevel saws, band saws, vertical saws, table saws, machine saws, circular saws, and chain saws), nail drivers, staplers, routers, sanders, and multi-function handheld rotary or reciprocating power tools. Handheld power tools include both cordless power tools with a built-in power supply, such as a battery, and handheld power tools that include cords that are plugged into an electrical outlet to provide electricity to the power tool. Measurement tools include both handheld and stationary devices that include an electronic device for performing a measurement, such as a digital microcontroller that interfaces with one or more sensors and generates digital data corresponding to a measurement. Electronic measurement tools include, but are not limited to, digital calipers, laser range finders, stud finders, levels, and temperature and humidity sensors. In the description below, the term "power tool" includes handheld power tools, larger power tools such as bench-top and stationary power tools, and measurement tools.

As used herein, the term "tag" refers to any device or article that is affixed to a power tool to store data about the power tool. The tag stores data in a format that is readable by one or more mobile electronic devices. One type of tag includes a radio transponder with an integrated memory. Examples of radio transponder tags include radio frequency ID (RFID) and NFC tags. The radio transponder tags can store data that are read by a radio transceiver in the mobile electronic device. Some forms of radio transponder tags include a writeable memory that stores data transmitted from the radio transceiver in the mobile electronic device during a data write operation in addition to providing stored data to the mobile electronic device during a data read operation. As described below, a tag in a power tool also includes a writeable memory that stores data generated by a digital controller in the power tool. Most RFID and NFC tags are referred to as "passive" tags that only operate when energized by an external sensor that supplies electrical power for the tag. Another type of tag, referred to as an "active tag" includes an internal electrical power source, such as a battery, and wireless transceivers that are configured to send and receive over a longer range than is typical for passive tags.

NFC tags operate using a short-range wireless communication signal, typically over a distance of several centimeters between a tag reader and a passive NFC tag that does not include a battery or independent power source. Active NFC tags include a battery or other independent power source and can communicate over longer distances. Typical NFC tags and tag sensors operate, for example, at 13.56 MHz with an over-the-air communication interface defined by the ISO/IEC 18000-3 standard. Typical NFC data transmission rates ranging from, for example, 106 kbit/s to 424 kbit/s. In general, NFC tags operate at lower radio frequencies than other forms of passive RFID tags that typically operate in the hundreds of megahertz or gigahertz frequency bands.

Figure 1:
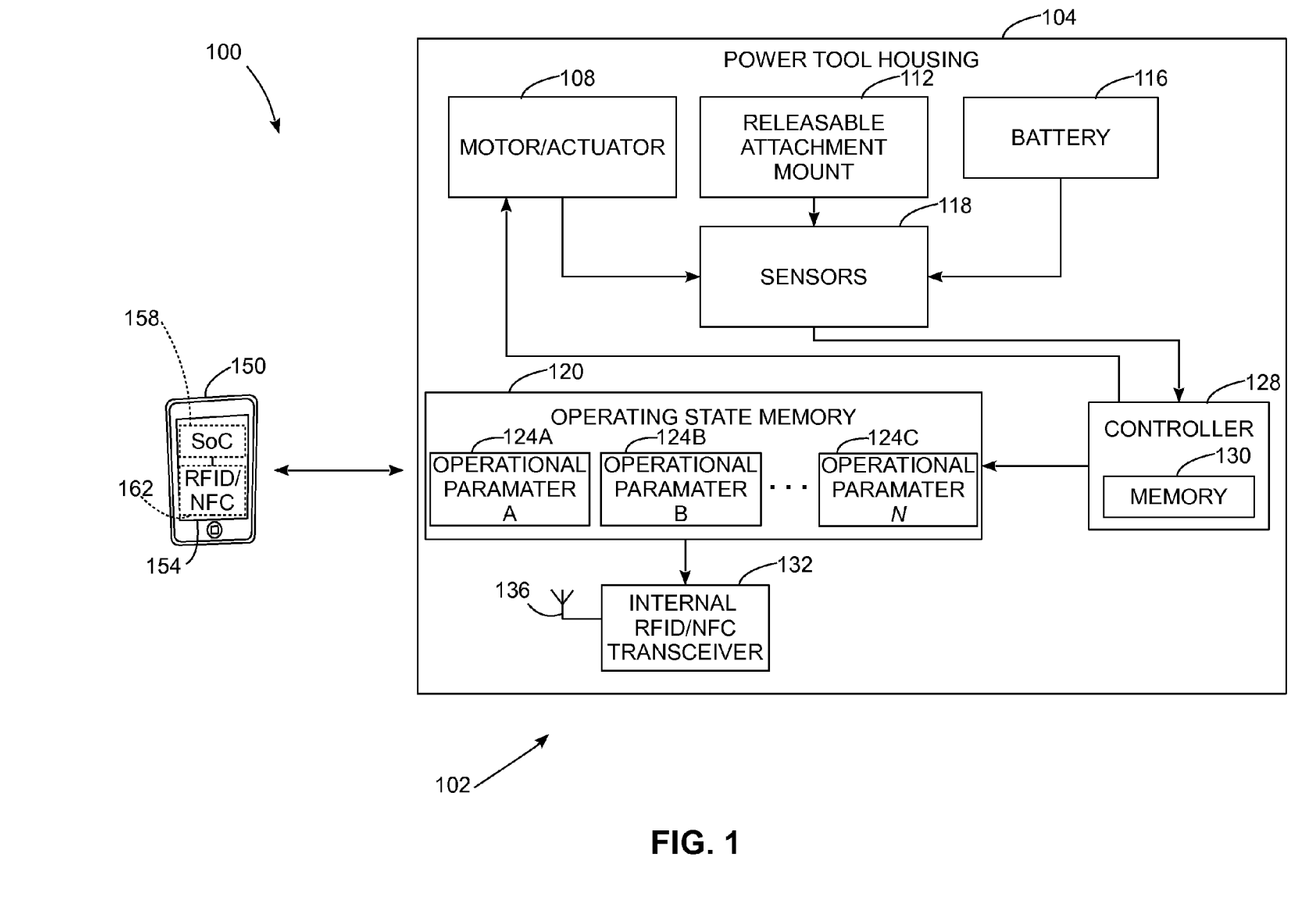
FIG. 1 is a schematic diagram of a system with one or more power tools that store operational parameter data in a memory for retrieval through a wireless transceiver in an external device.

FIG. 1 depicts a system 100 with at least one power tool, depicted as a power tool 102, which collects data corresponding to operational parameters during operation of the power tool and transmits the operational parameter data to an external electronic device, depicted as a mobile electronic device 150, with a wireless transceiver. In the system 100, the power tool 102 includes a housing 104 that either encloses or supports a moving member, such as a motor or actuator 108, a controller 128, an operating state memory 120 that is configured to store one or more operational parameters 124A-124C of the power 102, an internal wireless radio-frequency transceiver 132, and an antenna 136. In the embodiment of FIG. 1, the housing 104 also encloses or supports an optional releasable attachment mount 112, a battery 116, and one or more sensors 118.

In the power tool 102, the controller 128 includes one or more digital logic devices such as microcontrollers, microprocessors, application specific integrated circuits (ASICs), field programmable gate arrays (FPGAs), and the like. During operation, the controller 128 executes stored instructions in the form of software or firmware instructions that the controller 128 retrieves from an internal memory 130. The internal memory 130 includes one or more digital data storage devices including a volatile random access memory (RAM), such as static RAM or dynamic RAM, and a non-volatile memory such as a NOR or NAND flash device or an EEPROM. In one embodiment, the components in the controller 128 and the internal memory 130 are integrated into a System on a Chip (SoC) device.

During operation of the power tool, the controller 128 is configured to monitor the activation and deactivation of the motor or actuator 108 and to receive data from one or more sensors 118. The controller 128 generates data corresponding to one or more operational parameters both from data generated due to operation of the power tool 102 and from data received from the sensors 118. As used herein, the term "operational parameter" refers to any data that the controller 128 generates internally or receives from the sensors 118 about the operation of components in the power tool 102. For example, the controller 128 maintains a counter of the number of times that the motor or actuator 108 is activated, and in an embodiment where the motor 108 runs continuously, the controller 128 maintains a record of the total time that the motor 108 has been activated. The controller 128 also receives data from one or more sensors 118 in the power tool 102, and different sensor embodiments are described in more detail below.

In the power tool 102, the controller 128 identifies one or more operational parameters and stores generated data corresponding to each of the operational parameters in an operating state memory 120. The operating state memory stores data corresponding to one or more operational parameters as depicted by the operational parameters 124A-124C in FIG. 1. The operating state memory 120 is typically a non-volatile rewritable memory such as NAND or NOR flash memory. In some embodiments, the operating state memory is an EEPROM that is integrated with the internal RFID/NFC radio transceiver 132. The controller 128 writes data to the operating state memory 120 using, for example, an I²C data bus or other suitable communication interface.

In one embodiment, the RFID/NFC transceiver 132 and antenna 136 are combined into a tag that is affixed to the housing 104. As used herein, the term "affixed" refers to the engagement of the transceiver 132 to an exterior of the housing 104, interior of the housing 104, or to an indirect engagement of the transceiver to another component or structure that is within or supported by the housing 104. In some embodiments, the tag is located at or near the surface of the housing 104 to enable short-range wireless communication with the corresponding wireless transceiver 162 in the mobile electronic device 150. In another embodiment, the NFC/RFID radio transceiver 132 is integrated with the controller 128 in a System on a Chip (SoC) configuration. In one embodiment of the SoC configuration, the operating state memory 120 is integrated with a larger memory device such as a FLASH or EEPROM data storage device that stores programmed instruction code and other configuration data for the power tool 102. The antenna 136 is electrically connected to the SoC to enable the transceiver within the SoC to send and receive data from the wireless transceiver 162 in the mobile electronic device 150. In the power tool 102, the controller 128 stores the data for the operational parameters 124A-124C in the operating state memory 120.

In one embodiment, the operational parameters 124A-124C are stored using a predetermined data interchange format that an external device is configured to process for display to operators or maintenance personnel. For example, the operational parameters 124A-124C can be stored using a predetermined extensible markup language (XML) schema that is adopted for use in both the power tool 102 and mobile electronic device 150. In alternative embodiments, the power tool 102 and mobile electronic device 150 are configured to use different data interchange formats including binary and compressed interchange formats for the operating state data. In one embodiment, the controller 128 encrypts the operating state parameters 124 are stored in the memory 120 in an encrypted form or the operating state data are encrypted during transmission to the mobile electronic device 150. The mobile electronic device 150 is configured with a cryptographic key to decrypt the operating state data. The encryption of operating state data ensures that only authorized mobile electronic devices that include the appropriate decryption key can analyze operating state data that are received from the power tool 102. In some embodiments, the operating state memory 120 also includes static data that identify the model of the power tool and provide other data that remain constant during operation of the power tool. In the system 100, the mobile electronic device 150 uses the power tool identification data to generate different outputs of the operational parameter data that are customized for different types of power tools.

The controller 128 only writes the operational parameter data to the operating state memory 120 and does not read data from the operating state memory 120. Thus, the operation of the controller 128 is not affected if the content of the operating state memory 120 is altered by, for example, a mobile electronic device transmitting corrupted data to the RFID/NFC transceiver 132. Additionally, the RFID/NFC transceiver is not communicatively or operatively connected to the controller 128, which enables the controller 128 to continue operation without regard to the content of any signal that is received from the mobile electronic device 150 or other external wireless transceivers.

In the power tool 102, the motor or actuator 108 includes any member that moves under a source of artificial power, such as electric, hydraulic, or pneumatic power. For example, many power tools include electric motors that rotate an attachment or reciprocate an implement such as a saw blade. Other examples of actuators include pneumatic or hydraulic actuators that drive a piston in, for example, a nail driver or stapler. In some embodiments, the motor or actuator 108 is operatively connected to the controller 128. In the power tool 102, the controller 128 maintains a counter of the number of times that the motor or actuator is activated during operation of the power tool 102. For power tools with a motor that runs continuously while the power tool 102 is activated, the controller 128 also stores data corresponding to the accumulated time of operation for the motor 108. Additionally, one or more of the sensors 118 is coupled to the motor or actuator 118. For example, a tachometer sensor identifies the rotational rate of the motor 108, and a temperature sensor identifies the operating temperature of the motor. Other examples of sensors that are integrated with saws or other power tools include, but are not limited to, micro-electromechanical sensor (MEMS) devices that measure vibration levels in the tool or acoustic sensors that monitor the acoustic profile of the tool during operation. The MEMS or acoustic sensors are used to identify if one or more components in the power tool should be serviced or replaced during maintenance of the power tool.

In the power tool 102, the releasable attachment mount 112 includes, for example, a chuck or a saw blade attachment mount, which enables the operator to replace an attachment, such as a bit, implement, or blade that the motor 108 drives during operation of the power tool 102. In the embodiment of the power tool 102, a sensor 118 is coupled to the releasable attachment mount 112 and generates a signal when an attachment is replaced. For example, in one embodiment the sensor 118 generates a small electrical current through a circuit that passes through a metallic attachment in the releasable attachment mount 112. When the attachment is removed, the electrical circuit is opened; and when a new attachment is mounted in the releasable attachment mount 112, the electrical circuit is closed again. In another embodiment, the removable attachments include an integrated identification code that is, for example, stored in a read-only memory device that is embedded in the attachment. The sensor 118 reads the embedded identification code and the controller 128 receives the identification code to track the usage of individual attachments that are used with the power tool 102 in an interchangeable manner.

The controller 128 identifies a length of time that elapses after an attachment is mounted in the releasable attachment mount 112, and stores the data corresponding to the length of time as an operational parameter in the operating state memory 120. In one embodiment, the controller 128 identifies only the elapsed length of time that the motor or actuator 108 operates while the attachment is mounted to the releasable attachment mount 112. The elapsed length of time is used to indicate when an attachment should be serviced or replaced. For example, if the attachment is a saw blade in a power saw, then the controller 128 identifies an operational parameter corresponding to the length of time that the saw blade remains attached to the releasable attachment mount 112 during operation of the saw. In one embodiment, the mobile electronic device 150 receives the operational parameter data corresponding to the length of time that the saw blade has been in use, and generates a message or alert to indicate that the saw blade is due for replacement or sharpening after the blade has been in use for longer than a predetermined span of time.

In the embodiment of FIG. 1, the power tool 102 includes a battery 116 that supplies electrical power to various components in the power tool 102 including the motor or actuator 108, sensors 118, and the controller 128. Common battery embodiments include lithium ion, lithium oxygen, nickel metal hydride, lead acid, and nickel cadmium rechargeable batteries. Some power tool embodiments use non-rechargeable batteries instead of or in addition to the rechargeable batteries. In some power tool configurations, the battery 116 is a battery pack that includes multiple individual batteries that are electrically connected together to provide power to the power tool 102. One or more of the sensors 118 is configured as a battery monitor that monitors at least one of a state of charge or state of health of the battery 116. As used herein, the term "battery monitor" refers to one or more sensors that operate on a continual or periodic basis to generate measurements of, for example, an electrical current that flows into and out of the battery 116, a voltage level measured across the terminals of the battery 116, and a temperature sensor that monitors an internal temperature of the battery 116. The controller 128 estimates either or both of a state of charge in the battery 116 and a state of health of the battery using the data from the battery monitor sensors 118 and estimation techniques that are known in the art. In one embodiment, the battery monitor sensor 118 is integrated into the battery 116. In another embodiment, the battery monitor sensor 118 is integrated into the housing 104 of the power tool 102. In some embodiments, the batteries include an internal data storage device or other indicator that provides an identification number for each battery. The controller 128 reads the identification number for the battery when the battery is connected to the power tool 102. In one configuration, the operating state memory 120 stores a history of the battery identification numbers with the operational parameters 124 to identify when different batteries are connected to the power tool 102 and to identify the length of time that each battery is used during operation of the power tool 102.

The system 100 also includes an electronic device 150 that includes a display device 154, a digital processor, which is depicted as a system on a chip (SoC) processor 158, and another wireless transceiver 162. In the embodiment of FIG. 1, the electronic device 150 is a mobile electronic device, such as a smartphone or a tablet device, in which the wireless transceiver 162 is an integrated RFID or NFC reader. In other embodiments the electronic device 150 is a mobile or desktop personal computer (PC), a customized electronic device used to retrieve operational parameter data stored in power tools, or any other electronic device that includes a wireless transceiver that requests and receives data from the power tool 102. As described below, during operation the mobile electronic device 150 generates wireless request signals using the wireless transceiver 162, and the transceiver 132 in the power tool 100 transmits data corresponding to one or more of the operational parameters 124A-124C to the mobile electronic device 150. The mobile electronic device 150 then presents a graphical or optionally audible display corresponding to the data in the operational parameters that the NFC/RFID reader 162 receives from the RFID/NFC transceiver in 132 in the power tool 102. In some embodiments, the signal from the transceiver 162 in the mobile electronic device 150 provides the electrical energy that energizes the transceiver 132 through the antenna 136 and enables the transceiver 132 to transmit the contents of the operating state memory 120 to the external transceiver 162 in the mobile electronic device 150.

The power tool 102 is a schematic diagram of a power tool that includes stationary power tools and handheld power tools. For example, in one embodiment the power tool housing 104 is a housing for a bench-top table saw and the other components in the power tool 102. The power tool housing 104 contains or supports the motor 108, saw blade attachment mount 112, sensors 118, operating state memory 120, controller 128, internal radio transceiver 132, and antenna 136. In another embodiment, the power tool 102 is a handheld power tool with a handheld housing that contains or supports the components that are depicted in FIG. 1.

Figure 2:
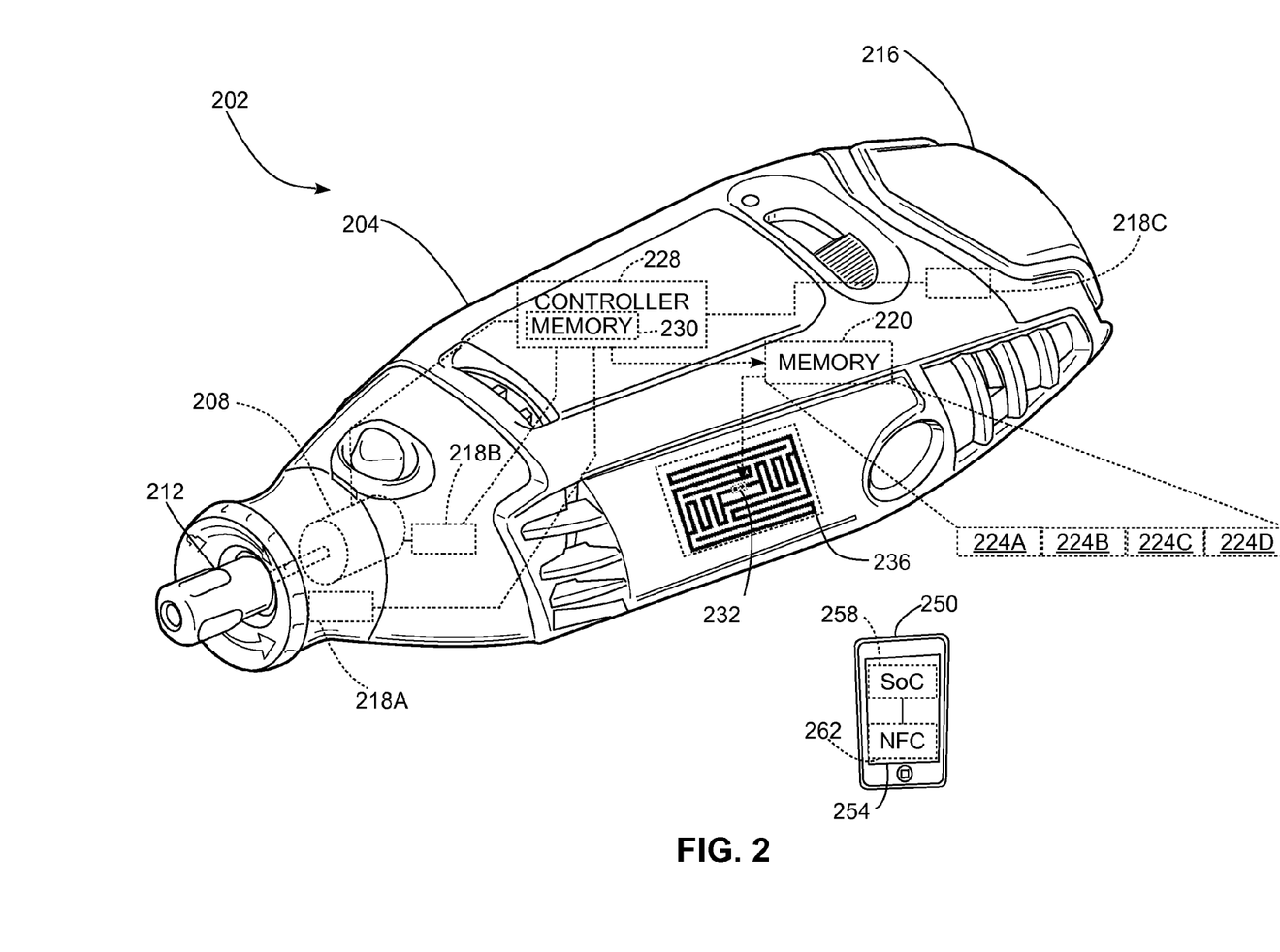
FIG. 2 is a perspective view of an embodiment of a power tool that is part of the system depicted in FIG. 1.

In the system 100, a wide range of stationary and handheld power tools can be configured to generate data corresponding to operational parameters and transmit the data to a wireless transceiver in an external electronic device. FIG. 2 depicts one example of a handheld battery-powered multipurpose power tool 202 that is configured for use with the system 100 for illustrative purposes. The power tool 202 includes a handheld housing 204 that an operator typically holds in one hand while using the power tool 202. The housing 204 encloses a rotating electric motor 208, a plurality of sensors 218A, 218B, and 218C, a controller 228 with internal memory 230, an operating state memory 220, RFID or NFC wireless transceiver 232, and antenna 236. In the embodiment of FIG. 2, the wireless transceiver 232 and antenna 236 form an RFID or NFC tag that is affixed to an inner surface of the housing 204. The housing 204 also supports a chuck 212 that is a releasable mount for one or more releasable attachments. Examples of releasable attachments include, but are not limited to, insertion or removal of an attachment, such as a drill bit, screwdriver bit, sanding pad, or cutting disk, from the chuck 212. The housing 204 also supports a battery 216 that engages the housing 204 and is electrically connected to the controller 228, motor 208, and other components in the power tool 202. During operation, the battery 216 can be removed for charging and replacement with another battery.

In the power tool 202, the controller 228 receives operational state data from sensors 218A, 218B, and 218C and is operatively connected to the motor 208. In the power tool 202 the sensor 218A is operatively connected to the chuck 212. In one embodiment the sensor 218A generates a signal in response to the completion of an electrical circuit when an attachment is mounted to the chuck 212 or in response to breakage of the electrical circuit formed when the attachment is released from the chuck 212. In another embodiment, the sensor 218A retrieves data from a read-only memory embedded in the attachment and sends identifier data, such as a serial number or other identification data, to the controller 228.

The sensor 218B is operatively connected to the motor 208. In one embodiment the sensor 218B is a temperature sensor that measures an operating temperature of the motor 208. In another embodiment the sensor 218B is a tachometer that measures the rotational rate of the motor 208 as the motor 208 rotates an attachment that is mounted in the chuck 212. In still another embodiment, the sensor 218B measures torque that the motor 208 generates during operation. Alternative embodiments of the sensor or sensors 218B include some or all of the sensors described above or additional motor sensors.

The sensor 218C includes one or more battery monitor sensors for the battery 216, including voltage, current, and temperature sensors. As described above, in one embodiment the battery monitor sensors 218C are integrated with the battery 216 and each replacement battery includes an integrated set of battery monitor sensors, while in another embodiment the battery monitors sensors 218C are integrated with the handheld housing 204. The controller 228 receives signals from the sensor 218C and generates estimates of, for example, the state of charge and state of health of the battery 216.

In addition to receiving operational state data from the sensors 218A-218C, the power tool 202, the controller 228 is operatively connected to the motor 208, and generates operational state data corresponding to the number of times that the motor 208 is activated and the length of time that the motor 208 runs during operation of the power tool 202. During operation, the controller 228 stores the operational state data from the sensors 218A-218C and the motor 208 in the operating state memory 220. In the embodiment of FIG. 2, the operating state memory 220 includes operational parameter data 224A corresponding to the data from the sensor 218A for the chuck 212, operational parameter data 224B that corresponds to data from the sensor 218B for the state of the motor 218B, and operational state data 224C corresponding to the data from the sensor 218C for the state of health and state of charge for the battery 216. The controller 228 also generates and stores operational state data 224D that correspond to the number of times that the motor 208 has been activated and the length of time that the motor 208 runs during operation.

In the power tool 202, the memory 220 is operatively connected to the RFID or NFC transceiver 232. In the embodiment of the power tool 202, the wireless transceiver 232 is a passive NFC transceiver that is affixed to an interior surface of the handheld housing 204 and electrically connected to a patch antenna 236. The NFC transceiver 232 and antenna 236 add minimal weight, typically 2 grams or less, to the handheld power tool 202. Additionally, the internal passive wireless transceiver 232 receives electrical power through an inductive or resonant coupling of the antenna 236 with an external wireless transceiver in an NFC reader, such as the mobile electronic device 150 of FIG. 1. Thus, the wireless transceiver 232 does not draw additional electrical power from the battery 216, and the power tool 202 operates in the system 100 with minimal impact on the size, weight, and battery life of the power tool 202.

During operation, an external electronic device, such as the smartphone 250, generates a request signal with a wireless transceiver in an NFC reader 262. In the embodiment of FIG. 2, the NFC transceiver 232 in the power tool 232 receives electrical power and the request signal from the NFC reader 262 through the antenna 236. The NFC transceiver 232 reads one or more of the operational parameters 224A-224D from the operating state memory 220, and transmits the operational parameter data to the smartphone 250. The smartphone 250 receives the data and a processor in the smartphone, such as the SoC 258, generates an output using, for example, an LCD display 254 in the smartphone 250. For example, the smartphone 250 generates one or more graphical displays depicting the length of time since an attachment in the power tool 202 was last replaced using the data 224A, the maximum operating temperature of the motor using the data 224B, the charge level of the battery 216 using state of charge data 224C, and the total length of time that the power tool 202 has operated the motor 208 with the operational parameter data 224D.

Figure 3:
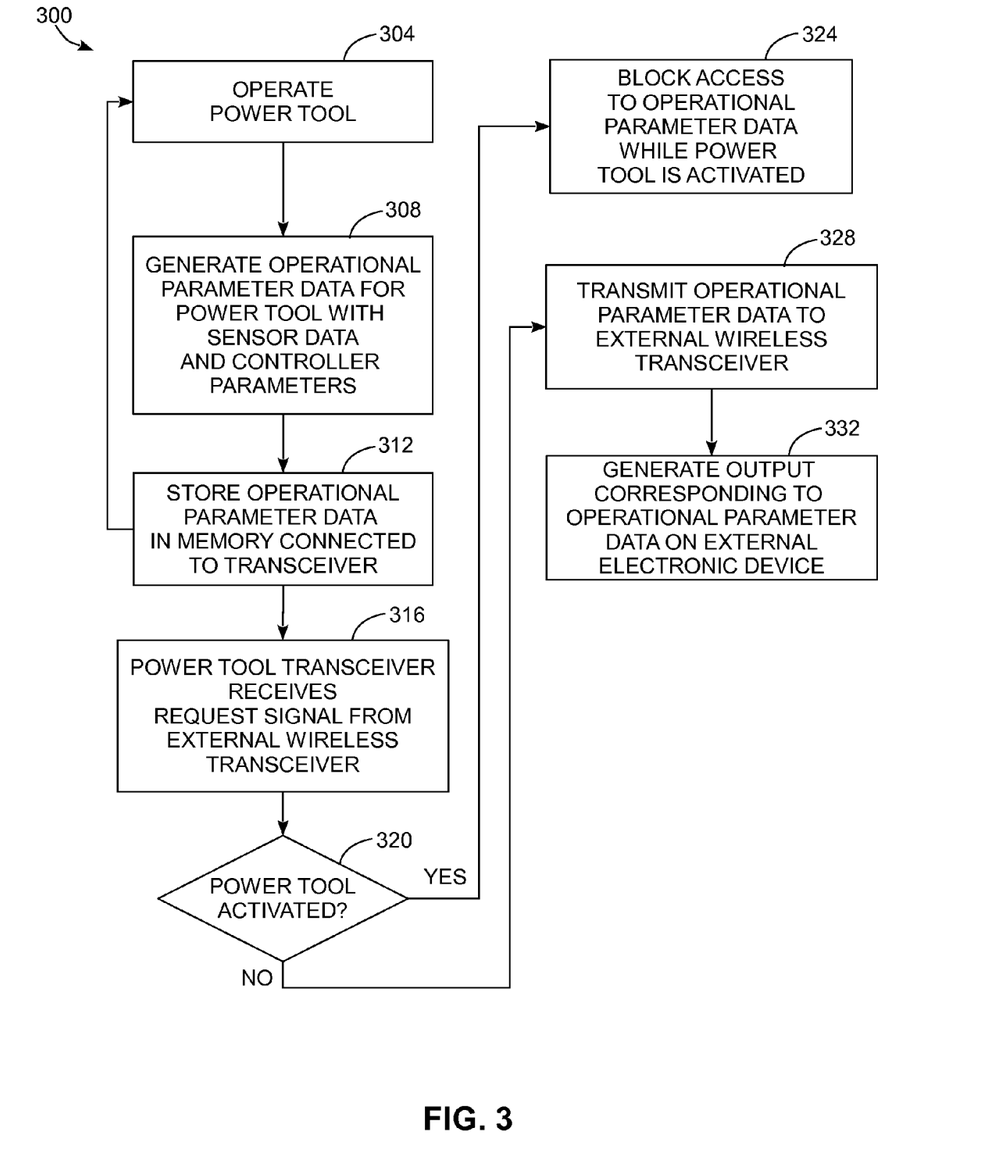
FIG. 3 is a block diagram of a process for generating operational parameter data for a power tool and retrieving the operational parameter data from the power tool for output on an external electronic device.

FIG. 3 depicts a process 300 for operating a power tool and retrieving operational parameter data from the power tool for display of the operational parameter data to operators or maintenance personnel. Process 300 is described in conjunction with the system 100 for illustrative purposes. In the discussion below, a reference to the process 300 performing a function or action refers to one or more processors, such as the controller 128 in the power tool 102 and SoC processor 158 in the mobile electronic device 150, executing programmed instructions stored in a memory to perform the function or action or to operate one or more components to perform the function or action. During process 300, both the power tool 102 and the mobile electronic device 150 perform functions in either a serial or concurrent manner, and unless explicitly stated otherwise, the description below does not impose a strict order on the operations that are described with reference to the process 300.

During process 300, an operator holds and operates the power tool 102 (block 304). During operation the operator depresses an activation switch or operates another control mechanism to activate the motor or actuator 108. During the use of the power tool, the operator does not need to take additional actions to use the power tool beyond the actions that are required for normal operation of the power tool. Additionally, the mechanical operation of the power tool, such as the operation of the motor or actuator 108, remains unchanged from prior art power tools.

As the operator uses the power tool 102, the controller 128 generates operational parameter data with reference to the operation of the power tool 102 and with reference to data received from one or more of the sensors 118 (block 308). As described above with reference to FIG. 1 and FIG. 2, different power tool embodiments include controllers and sensors that generate data corresponding to a wide range of operational parameter data that are generated in different power tools. During process 300, the operational parameter data are stored in a memory for wireless radio transmission to a wireless transceiver in an external wireless device (block 312). In the embodiment of the power tool 102, the controller 128 generates the operational parameter data and stores the data corresponding to the operational parameters 124A-124C in the operating state memory 120 during operation of the power tool 102.

During process 300, the processing that is described above with reference to the blocks 304-312 continues as an operator uses the power tool. During process 300, the operator or maintenance personnel also retrieves operational parameter data from the power tool for output using an external electronic device, such as the mobile electronic device 150 that is depicted in FIG. 1. For example, in the system 100 the mobile electronic device 150 generates a request signal using the RFID/NFC transceiver 162. The corresponding RFID/NFC transceiver 132 in the power tool 102 receives the request signal (block 316). As described above, in some embodiments the RFID/NFC transceiver 132 is a passive transceiver that receives electrical energy through the antenna 136 from the transceiver 162 in the mobile electronic device 150. In a passive transceiver embodiment, the RFID/NFC transceiver 132 in the power tool 102 is typically capable of transmitting data to the transceiver 162 in the mobile electronic device 150 at a range of up to 10 centimeters.

In an optional embodiment of the process 300, if the power tool 102 is activated (block 320), then the controller 128 in the power tool blocks access to the operational parameter data in the operating state memory 120 (block 324). For example, if the power tool 102 includes an electric motor 108, then the controller 128 prevents the wireless transceiver 132 from reading operational parameter data from the memory 120 and transmitting the operational parameter data when the electric motor 108 is activated. In one embodiment, the controller 128 disables a "read enable" line or other control line in the operating state memory 120 that disables access for the wireless transceiver 132 during operation of the electric motor 108. The controller 128 enables access to the operating state memory 120 when the electric motor 108 is deactivated. In the optional embodiment of the process 300, the controller 128 disables access to the operating state memory 120 to reduce distraction from the output of the mobile electronic device 150 while the power tool 102 is activated.

In another embodiment, the wireless transceiver in the power tool is configured to read data from the operating state memory when the motor or actuator in the power tool is activated. For example, in a "live streaming" configuration the controller 128 writes data to the operating state memory 120 at regular intervals during operation of the power tool 102. The mobile electronic device 150 polls the RFID/NFC radio transceiver 132 in the power tool 104 to retrieve the operational parameters 124A-124C as the operational parameter data are written to the operating state memory 120. The mobile electronic device 150 stores the operational parameter data in association with a time index to identify changes to the operational parameters of the power tool 102 over time. For example, in one embodiment the power tool 102 includes a tachometer sensor that monitors the rotational rate of the motor 108. As the power tool 102 operates, the motor 108 rotates at different rates and the controller 128 updates the operating state memory 120 with a rotational rate operational parameter that corresponds to the output of the tachometer. The mobile electronic device 150 receives the operational parameter data through the RFID/NFC transceiver 132 and generates a graph or other continuously updated display of the rotational rate of the motor 108 over time during operation of the power tool 102.

During process 300, if the power tool is not activated (block 320) then the RFID/NFC wireless transceiver 132 in the power tool 102 reads operational parameter data from the operating state memory 120 and transmits the operational parameter data to the external wireless transceiver in the mobile electronic device 150 (block 328). In one embodiment, the request signal from the RFID/NFC transceiver 162 in the mobile electronic device 160 does not specify the operational parameters, and the transceiver 132 in the power tool 102 transmits data corresponding to each of the operational parameters 124A-124C that are stored in the operating state memory 120. In another embodiment, the request signal identifies a specific operational parameter or a subset of the operational parameters and the wireless transceiver 132 only transmits data corresponding to the selected operational parameters to the mobile electronic device 150.

In process 300, the external electronic device that receives operational parameter data from the power tool generates an output with reference to the received data (block 332). For example, in the system 100 the mobile electronic device 150 generates a graphical display with the LCD display 154 that corresponds to the operational parameter data that are received from the power tool 102. In one embodiment the mobile electronic device 150 displays the operational parameters as text, or presents the data in a graphical abstraction. For example, in one embodiment the mobile electronic device 150 receives operational parameter data corresponding to the operating temperature of the motor 108 in the power tool 100, and displays a graphic corresponding to a thermometer to display the temperature in a format that is easily understood by the operator. In another embodiment, the mobile electronic device 150 retrieves operational parameter data from the power tool 102 at a plurality of times during operation and records the operational parameter data. The operator or maintenance personnel subsequently view graphs or text of the operational parameter data to review a history of the state of the power tool 102 during operation.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A power tool data communication system comprising:
a housing of a power tool;
a memory within the housing, the memory being configured to store data corresponding to at least one operational parameter of the power tool;
a wireless data transceiver affixed to the housing of the power tool and communicatively connected to the memory, the wireless data transceiver being configured to transmit the data corresponding to the at least one operational parameter of the power tool to an external wireless transceiver in response to receiving a signal from the external wireless transceiver;
a releasable engagement mount that is configured to secure a removable attachment to the power tool;
a sensor associated with the releasable attachment mount, the sensor being configured to generate an attachment signal in response to an attachment engaging the releasable attachment mount; and
a controller within the housing of the power tool, the controller being operatively connected to the memory and the sensor, the controller being configured to:
identify the at least one operational parameter of the power tool during operation of the power tool, including engagement of an attachment to the releasable attachment mount with reference to the attachment signal received from the sensor and a length of time corresponding to the operation of the power tool after the engagement of the attachment to the releasable attachment mount; and
store the data corresponding to the at least one operational parameter including the length of time in the memory to enable the wireless data transceiver to transmit the data.

2. The system of claim 1, the wireless transceiver being a radio-frequency identification (RFID) transceiver.

3. The system of claim 2, the RFID transceiver being a near-field communication (NFC) transceiver.

4. The system of claim 1, the controller being further configured to:
identify the at least one operational parameter including a count of a number of times that the power tool has been activated; and
store data corresponding to the identified count in the memory.

5. The system of claim 1 further comprising:
a temperature sensor located in the housing and configured to generate data corresponding to a temperature of the power tool; and
the controller being operatively connected to the temperature sensor and further configured to:
identify the at least one operational parameter including the temperature of the power tool received from the temperature sensor; and
store data corresponding to the identified temperature in the memory.

6. The system of claim 1 further comprising:
a motor configured to rotate during operation of the power tool;
a tachometer configured to identify a rate of the rotation of the motor during operation of the power tool; and
the controller being operatively connected to the tachometer and further configured to:
  identify the at least one operational parameter including the rate of rotation of the motor received from the tachometer; and
  store data corresponding to the identified rate of rotation of the motor in the memory.

7. The system of claim 6 further comprising:
at least one of a vibrational sensor or an acoustic sensor located in the housing and configured to generate data corresponding to a level of vibration or sound, respectively, in the motor of the power tool; and
the controller being operatively connected to the vibrational or acoustic sensor and further configured to:
  identify the at least one operational parameter including the level of vibration or sound of the motor received from the vibrational or acoustic sensor, respectively; and
  store data corresponding to the identified operational parameter in the memory.

8. The system of claim 1 further comprising:
a battery mechanically connected to the housing and configured to provide electrical power to the power tool;
a battery monitor configured to monitor at least one of a state of charge and a state of health in the battery; and
the controller being operatively connected to the battery monitor and further configured to:
  identify the at least one operational parameter including at least one of the state of charge and the state of health in the battery with reference to data received from the battery monitor; and
  store data corresponding to at least one of the identified state of charge and state of health operational parameters in the memory.

9. The system of claim 1, the external wireless transceiver being incorporated in a mobile electronic device, the mobile electronic device further comprising:
an output device; and
  a processor operatively connected to the external wireless transceiver and the output device, the processor being further configured to:
  identify the at least one operational parameter in the data received from the wireless transceiver in the power tool; and
  generate an output with the output device with a predetermined format corresponding to the data of the identified at least one operational parameter.

10. The system of claim 9, the processor in the mobile electronic device being further configured to:
operate the external wireless transceiver to transmit the signal to the wireless transceiver in the power tool.

11. A method for collecting data from a power tool comprising:
identifying with a controller in a housing of the power tool, at least one operational parameter of the power tool during operation of the power tool including an engagement of a removable attachment to a releasable engagement mount in the tool with reference to data received from a sensor associated with the releasable engagement mount and a length of time corresponding to the operation of the power tool after the engagement of the removable attachment to the releasable engagement mount;
storing with the controller, data corresponding to the at least one operational parameter including the length of time in a memory in the power tool; and
transmitting with a wireless transceiver in the power tool, the data corresponding to the at least one operational parameter in the memory including the length of time to an external wireless transceiver in response to receiving a signal from the external wireless transceiver.

12. The method of claim 11 further comprising:
identifying with the controller the at least one operational parameter including a count of a number of times that the power tool has been activated; and
storing with the controller data corresponding to the identified count in the memory.

13. The method of claim 11 further comprising:
identifying with the controller the at least one operational parameter including a temperature of the power tool with reference to temperature data received from a temperature sensor in the housing; and
storing with the controller data corresponding to the identified temperature in the memory.

14. The method of claim 11 further comprising:
identifying with the controller the at least one operational parameter including a rate of rotation of a motor in the housing of the power tool with reference to data received from a tachometer associated with the motor; and
storing with the controller data corresponding to the identified rate of rotation of the motor in the memory.

15. The method of claim 11, the controller being further configured to:
identify an engagement of a saw blade to a releasable saw blade mount with reference to data received from a sensor associated with the releasable saw blade mount.

16. The method of claim 11 further comprising:
identifying with the controller the at least one operational parameter including at least one of a state of charge and a state of health in a battery that provides electrical power to the power tool with reference to data received from a battery monitor; and
storing with the controller data corresponding to the at least one of the identified state of charge and state of health operational parameters in the memory.

17. The method of claim 11 further comprising:
transmitting with the wireless transceiver in the power tool the data from the memory in the power tool to the external wireless transceiver in a mobile electronic device;
identifying with a processor in the mobile electronic device the at least one operational parameter in the data received from the wireless transceiver in the power tool; and
generating with an output device in the mobile electronic device an output with a predetermined format corresponding to the data of the identified at least one operational parameter.

18. The method of claim 17 further comprising:
transmitting with the external wireless transceiver in the mobile electronic device a request signal to the wireless transceiver in the power tool; and
transmitting with the wireless transceiver in the power tool the data corresponding to the at least one operational parameter of the power tool in response to receiving the request signal.

* * * * *